(12) United States Patent
Sun (10) Patent No.: US 8,755,829 B2
(45) Date of Patent: Jun. 17, 2014

(54) METHOD AND APPARATUS FOR RADIO RESOURCE MEASUREMENT IN HETEROGENEOUS NETWORK

(75) Inventor: Chengjun Sun, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 271 days.

(21) Appl. No.: 13/289,859

(22) Filed: Nov. 4, 2011

(65) Prior Publication Data

US 2012/0115529 A1      May 10, 2012

(30) Foreign Application Priority Data

Nov. 5, 2010   (CN) .......................... 2010 1 0539179

(51) Int. Cl.
*H04W 72/04*     (2009.01)
(52) U.S. Cl.
USPC ................... 455/509; 455/452.1; 455/67.11; 455/517
(58) Field of Classification Search
USPC ........... 455/517, 452.1, 450, 509, 452.2, 513, 455/67.11, 67.13, 63.1, 67.16, 63.2, 414.1, 455/423, 453; 370/329, 252
See application file for complete search history.

(56) References Cited

U.S. PATENT DOCUMENTS

| | | | |
|---|---|---|---|
| 2007/0064669 A1 | 3/2007 | Classon et al. | |
| 2009/0252077 A1 | 10/2009 | Khandekar et al. | |
| 2010/0159936 A1 | 6/2010 | Brisebois et al. | |
| 2010/0195582 A1 | 8/2010 | Koskinen | |
| 2012/0140706 A1* | 6/2012 | Doppler et al. | 370/328 |
| 2013/0215785 A1* | 8/2013 | Jung et al. | 370/252 |
| 2013/0223268 A1* | 8/2013 | Jung et al. | 370/252 |

OTHER PUBLICATIONS

International Search Report dated May 24, 2012 in connection with International Patent Application No. PCT/KR2011/008385.
Written Opinion of International Searching Authority dated May 24, 2012 in connection with International Patent Application No. PCT/KR2011/008385.

* cited by examiner

*Primary Examiner* — John J Lee (57) ABSTRACT

A radio resource measurement method in a heterogeneous network includes a user equipment (UE) that performs radio resource measurement; when a measurement result meets a predefined condition, the UE performs radio resource measurement on restricted resources according to configuration information of the restricted resources, wherein the restricted resources are a set of all sub-frame resources corresponding to Almost Blank Sub-frames (ABSes) or are a subset of the set. Therefore, the precision of RLM measurement or RRM measurement of a mobility system can be improved, and the implementation complexity of the UE can be decreased.

20 Claims, 8 Drawing Sheets

METHOD AND APPARATUS FOR RADIO RESOURCE MEASUREMENT IN HETEROGENEOUS NETWORK

CROSS-REFERENCE TO RELATED APPLICATION AND CLAIM OF PRIORITY

The present application is related to and claims priority under 35 U.S.C. §119 to an application filed in the Chinese Intellectual Property Office on Nov. 5, 2010 and assigned Application No. 201010539179.X, the contents of which are incorporated herein by reference.

FIELD OF THE INVENTION

The present invention relates to radio communication technologies, and more particularly to a radio resource measurement method in a heterogeneous network.

BACKGROUND OF THE INVENTION

In conventional 3GPP technical specification of Rel-8 or Rel-9, two kinds of radio resource measurement need to be performed by a User Equipment (UE), one is radio link monitoring (RLM) measurement, and the other one is Radio Resource Management (RRM) measurement. A specific measurement process is described in 3GPP TS 36.133 v8.11.0 and TS 36.133 v9.5.0.

The RLM measurement is performed when the UE needs to monitor the downlink quality of a serving cell to report an out-of-sync or in-sync state to a higher layer. The UE monitors the downlink quality of the serving cell based on a Cell-specific Reference Signal (CRS).

In the RLM measurement, the UE needs to estimate the downlink quality, and then compares the downlink quality with threshold values Qout and Qin, so as to evaluate the downlink quality of the serving cell. The threshold value Qout is defined as a channel quality level at which the downlink can not be received reliably, and the threshold value Qin is defined as a channel quality level at which the downlink can be received accurately.

In a non-Discontinuous Reception (non-DRX) mode, the physical layer (Layer 1) of the UE needs to evaluate the channel quality of the last period every radio frame of 10 ms and compare the channel quality with the threshold values Qout and Qin. When the evaluated channel quality is lower than the threshold value Qout, the physical layer of the UE needs to report out-of-sync to a higher layer. When the evaluated channel quality is higher than the threshold value Qin, the physical layer of the UE needs to report in-sync to the higher layer.

In each radio frame, when the downlink quality evaluated every period of 200 ms is lower than the threshold value Qout, the physical layer of the UE transmits an out-of-sync indication to the higher layer. In each radio frame, when the downlink quality evaluated every period of 100 ms is higher the threshold value Qin, the physical layer of the UE transmits an in-sync indication to the higher layer. The out-of-sync and in-sync evaluation should meet a condition that the interval of two continuous physical layers is 10 ms at least.

In a DRX mode, the physical layer of the UE needs to evaluate the channel quality of the past period every DRX period and compare the channel quality with the threshold values Qout and Qin. When the evaluated channel quality is lower than the threshold value Qout, the physical layer of the UE needs to report out-of-sync to the higher layer. When the evaluated channel quality is higher than the threshold value Qin, the physical layer of the UE needs to report in-sync to the higher layer.

In the DRX mode, the evaluation period of Qout (TEvaluate_Qout_DRX) and the evaluation period of Qin (TEvaluate_Qin_DRX) are defined in Table 1.

TABLE 1 the evaluation periods of Qout and Qin in the DRX mode

| The length of DRX period (s) | TEvaluate_Qout_DRX and TEvaluate_Qin_DRX (s) (the number of DRX periods) |
|---|---|
| ≤0.04 | [Note (20)] |
| 0.08 | [0.8 (10)] |
| 0.16 | [1.6 (10)] |
| 0.32 | [3.2 (10)] |
| 0.64 | [6.4 (10)] |
| 1.28 | [6.4 (5)] |
| 2.56 | [12.8 (5)] |

Note:
the evaluation period is dependent on the length of the DRX period in the DRX mode.

The UE needs to perform RRM measurement to identify a neighbor cell, and performs Reference Signal Receiving Power (RSRP) measurement or Reference Signal Receiving Quality (RSRQ) measurement for the identified neighbor cell. In a shared-frequency RRC_CONNECTED state, the UE needs to perform continuous RRM measurement for the identified cell, and search for some new cells.

In the non-DRX mode, a measurement period of performing shared-frequency RSRP and RSRQ measurement by the UE is 200 ms. In the measurement period, it is related to an implementation that the UE performs RSRP or RSRQ measurement on which sub-frame, and the specification does not limit the measurement on a sub-frame of a non-Multicast Broadcast Single Frequency Network (non-MBSFN).

TABLE 2 the measurement period of RRM of shared-frequency cell in the DRX mode

| The length of DRX period (s) | Tmeasure_intra (s) (the number of DRX periods) |
|---|---|
| ≤0.04 | 0.2 (Note 1) |
| 0.04 < DRX-cycle ≤ 2.56 | (Note 2) (5) |

(Note 1):
the number of DRX periods is dependent on the length of the DRX period in the DRX mode.
(Note 2):
the measurement period is dependent on the length of the DRX period in the DRX mode.

In the measurement period, it is related to an implementation that the UE performs RSRP measurement or RSRQ measurement on which sub-frame, and the specification does not limit the measurement on a sub-frame of the non-MBSFN.

For an event-driven measurement report, when a measurement report condition is met, the UE will transmit an event-driven measurement report.

In an idle mode, the UE needs to perform RRM measurement for the current cell and neighbor cells every DRX period, to measure the current cell and identify the neighbor cells. If the signal strength or RSRQ of the current cell and a neighbor cell meets a certain condition, the UE performs cell reselection to select the measured neighbor cell as a new resident cell.

In current 3GPP, as a technical solution which can greatly improve system throughput and whole network efficiency, a Heterogeneous Network (Hetnet) formed by different power nodes in the same covering area in Long Term Evolution (LTE) and LTE-Advanced (LTE-A) attracts much attention. In March, 2010, a work project of Enhanced Inter-cell Interference Coordination (eICIC) for HetNet is set up.

The eICIC for HetNet is a technical solution which can greatly improve system throughput and whole network efficiency. The Heterogeneous Network is a heterogeneous system which is formed by different types of nodes in the same covering area by configuring Low Power Nodes (LPNs) in a covering area of a Macro Node B. The LPNs include a Pico Node B and a Home Node B (HNB).

An important problem in the Heterogeneous Network is interference between the nodes in the same covering area, especially the transmission power of the Macro Node B is much larger than that of the LPN, which results in interference of the Macro Node B on the downlink receiving of boundary users in the LPN and interference of a large power node at the boundary of the Macro Node B on a neighbor LNP. In addition, in a scenario in which the Home Node B controls a Closed Subscriber Group (CSG), the transmission of the Home Node B will result in large interference on users of a neighbor Macro Node B.

In the discussion on 3GPP, many interference coordination technologies are put forward, e.g., resource division and power control technologies. The interference coordination of time domain is an important method, which can avoid that the Macro Node B and the LPN transmit data on the same sub-frame at the same time. The data transmission of one node can be limited on some sub-frames, so as to decrease interference on users served by the other one node.

Figure 1:
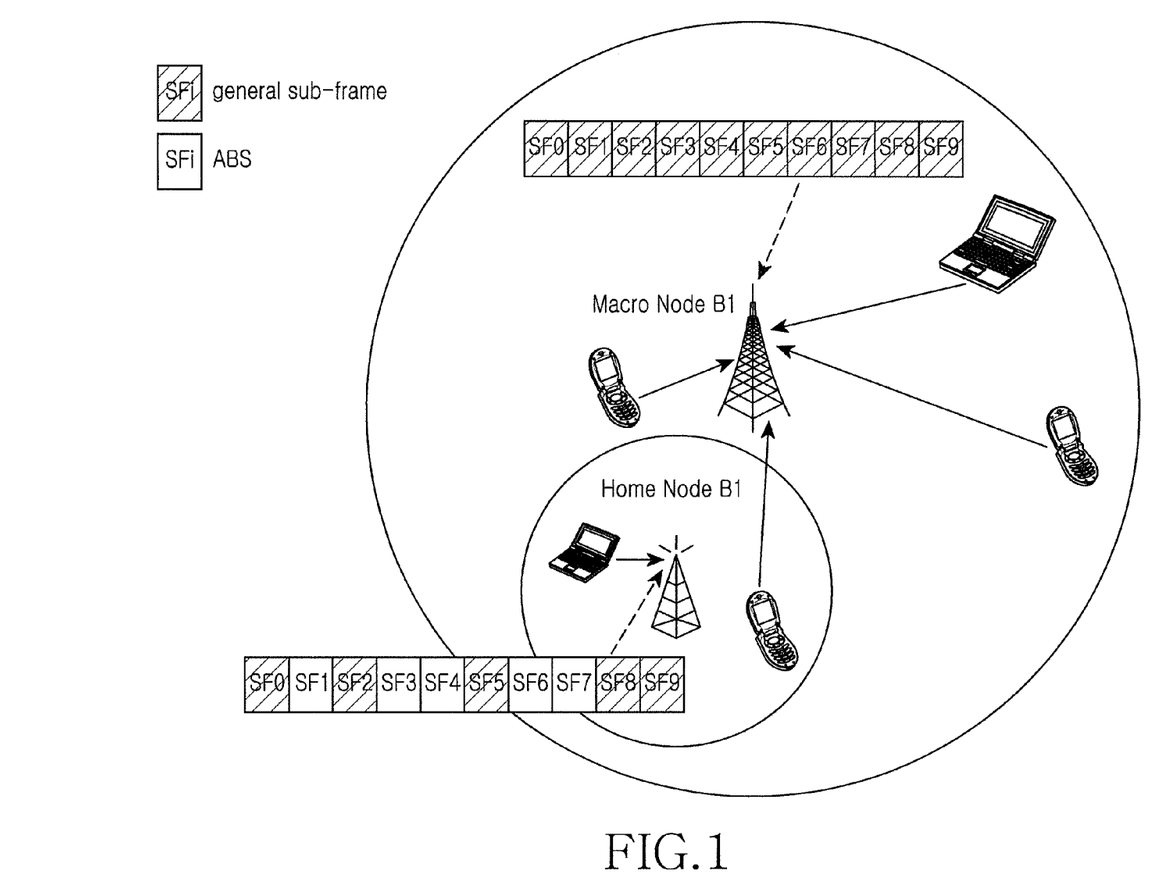
FIG. 1 illustrates an interference diagram in a Macro Node B-Home Node B scenario.

In a Macro Node B-Home Node B scenario, a UE under the Macro Node B in a non-CSG will be interfered greatly when the UE approaches some Home Nodes B in the CSG, as shown in FIG. 1. FIG. 1 is an interference diagram in a Macro Node B-Home Node B scenario.

In the scenario shown in FIG. 1, users under the Macro Node B in the covering area of Home Node B 1 cannot correctly receive control information and data unless some eICIC methods are used.

The eICIC method of time domain includes that the Home Node B generates some Almost Blank Sub-frames (ABSes) through some special scheduling, that is, the HNB generates sub-frames with little interference, and then the control information and data of the users under the Macro Node B only can be scheduled on those sub-frames with little interference, so as to guarantee that the control information and data of the users under the Macro Node B can be received correctly.

Figure 2:
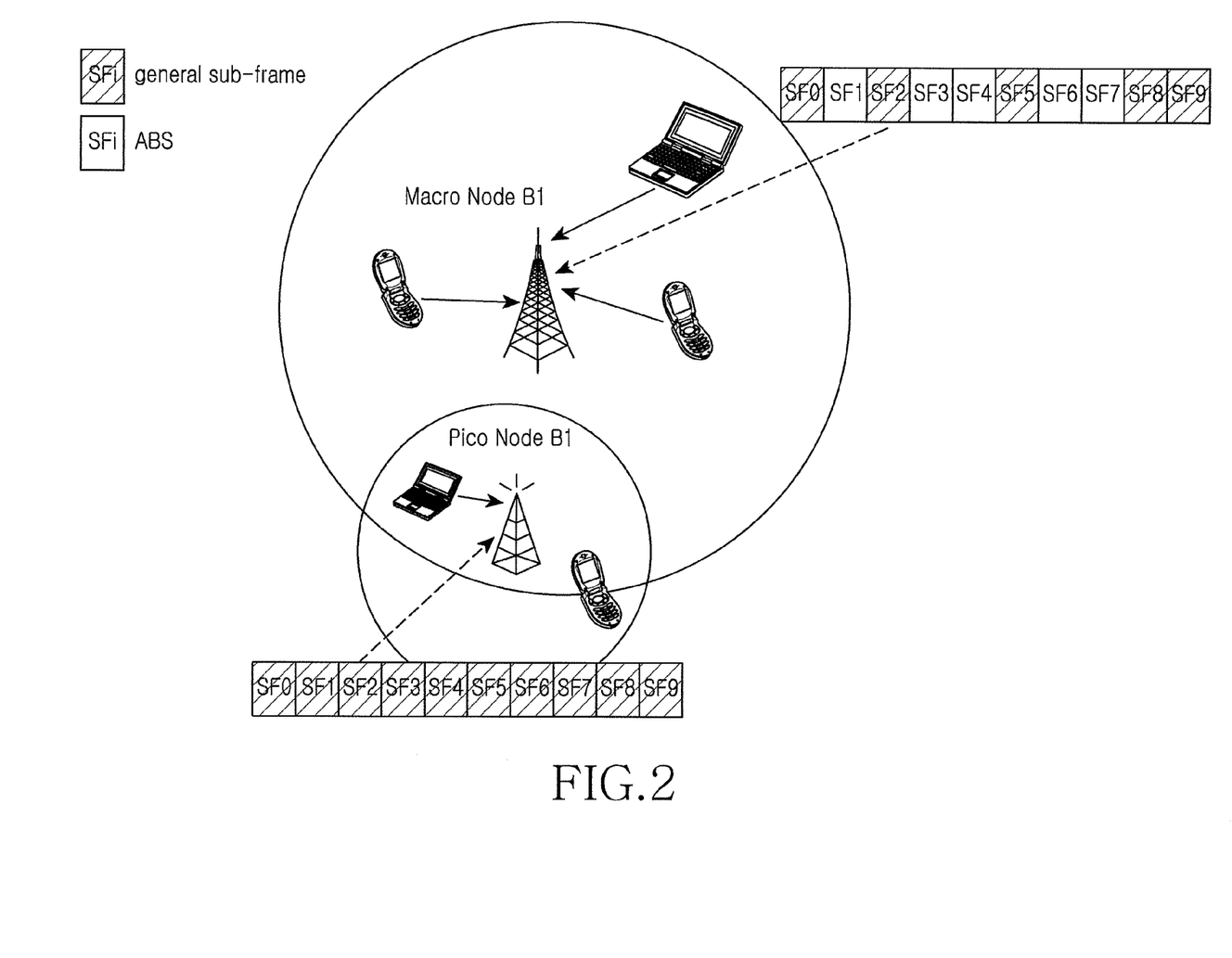
FIG. 2 illustrates an interference diagram of a Macro Node B-Pico Node B scenario.

Similarly, when the Macro Node B greatly interferes with the user of the LPN, e.g. a Pico Node B, those ABSes also can be applied to the Macro Node B, as shown in FIG. 2. FIG. 2 is an interference diagram of a Macro Node B-Pico Node B scenario.

In FIG. 2, the Macro Node B transmits data only on sub-frames 0, 2, 5, 8 and 9, and does not transmit data on sub-frames 1, 3, 4, 6 and 7, which are ABSes. In this way, the Pico Node B only makes the users at the boundary of a Pico cell transmit downlink data on the sub-frames 1, 3, 4, 6 and 7, so as to avoid the interference of the Macro Node B on the users at the boundary of the Pico cell.

According to the discussion on 3GPP, if RLM measurement or RRM measurement is performed according to a RLM measurement process in LTE Rel-8 or Rel-9 or according to a RRM measurement process in LTE Rel-8 or Rel-9, the UE does not differentiate ABSes and non-ABSes, but performs the RLM measurement or the RRM measurement, which will result in unnecessary radio Link Failure (RLF) processing and switching. The RLM measurement process and the RRM measurement process in LTE Rel-8 or Rel-9 are methods described in 3GPP TS 36.133 v8.11.0 and TS 36.133 v9.5.0.

And thus, in the current discussion on 3GPP, a resolution points out that in a Macro Node B-Home Node B scenario and a Macro Node B-Pico Node B scenario, a serving cell of the UE will make the UE perform the RLM measurement or the RRM measurement on restricted resources, so as to avoid the Radio Link Failure processing and switching.

For example, in the Macro Node B-Home Node B scenario shown in FIG. 1, the Home Node B transmits data to a UE under the Home Node B only on sub-frames 0, 2, 5, 8 and 9, and the Macro Node B schedules data transmission for a UE neighbor to the Home Node B on sub-frames 1, 3, 4, 6 and 7, because the sub-frames 1, 3, 4, 6 and 7 correspond to ABSes of the Home Node B. Since the UE under the Macro Node B performs RLM measurement or RRM measurement only on the sub-frames 1, 3, 4, 6 and 7 or a subset of the set of these sub-frames, the measured interference is much smaller than the interference obtained based on the RLM measurement or RRM measurement in LTE Rel-8 or Rel-9, and a measurement result obtained by performing RLM measurement or RRM measurement on the sub-frames 1, 3, 4, 6 and 7 or the subset of the set of these sub-frames can correctly reflect an actual state of the UE. Thus, the UE under the Macro Node B should perform the RLM measurement or the RRM measurement on the restricted resources, that is, perform the RLM measurement or the RRM measurement on the sub-frames 1, 3, 4, 6 and 7 or the subset of the set of these sub-frames.

However, when the UE under the Macro Node B performs RLM measurement or RRM measurement on the restricted resources, there are following problems.

When UEs under the Macro Node B move in the covering area of the Macro Node B, most UEs do not pass by the covering area of the Home Node B. In this case, if all UEs are configured to perform RLM measurement or RRM measurement on the restricted resources, the measurement precision will be decreased because performing measurement on the restricted resources means the decrease of the measured samples. In addition, if it is necessary to guarantee the measurement precision, an additional measurement process or measurement value processing process needs to be added, which will result in the complexity of the RLM measurement or RRM measurement.

In addition, according to the current conclusion of 3GPP, in the Macro Node B-Home Node B scenario, there is no Backhaul coordination between the Macro Node B and the Home Node B. Thus, when the ABS configured by the Home Node B changes, the Home Node B can not notifies the Macro Node B instantly.

Therefore, it is necessary to provide an improved method, to improve the measurement precision of the RLM measurement and RRM measurement in the Heterogeneous Network, so as to decrease the complexity of the RLM measurement and RRM measurement and guarantee system stability.

SUMMARY OF THE INVENTION

To address the above-discussed deficiencies of the prior art, it is a primary object to provide a radio resource measurement method in a heterogeneous network, so as to improve the precision of RLM measurement or RRM measurement of a mobility system and decrease the implementation complexity of UE.

In order to achieve the above object, a radio resource measurement method in a heterogeneous network includes:

A) performing, by a User Equipment (UE), radio resource measurement;

B) when a measurement result obtained in step A) meets a predefined condition, performing, by the UE, radio resource measurement on restricted resources according to configuration information of the restricted resources, wherein the restricted resources are a set of all sub-frame resources corresponding to Almost Blank Sub-frames (ABSes) or are a subset of the set.

As can be seen from the above technical solution, the UE does not need to perform measurement on the restricted resources in any case, but further determines whether to perform measurement on the restricted resources according to the measurement result obtained in a LTE Rel-8 or Rel-9 measurement method, so as to avoid an unnecessary complex measurement process, decrease the measurement complexity of the UE in the heterogeneous network, and guarantee the measurement precision and measurement stability.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 3 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

In the radio resource measurement method provided by the present disclosure, a UE performs radio resource measurement on unrestricted resources first, and when a measurement result meets a predefined condition, performs radio resource measurement on restricted resources. The restricted resources are ABS related resources, the unrestricted resources are all possible measurement resources including the restricted resources in a certain measurement period, and thus the unrestricted resources can include measurement resources corresponding to ABSes and measurement resources corresponding to non-ABSes. The ABS related resources can be equal to a set of all sub-frame resources corresponding to the ABSes, or smaller than a set of all sub-frame resources corresponding to the ABSes, i.e. a subset of the set of all sub-frame resources corresponding to the ABSes. An implementation of performing measurement on the unrestricted resources is to perform measurement on measurement resources in a certain measurement period according to a Rel-8 or Rel-9 measurement method.

Generally, a Macro Node B transmits configuration information of the restricted resources to the UE, the configuration information of the restricted resources can also be defined by a specification, and the Macro Node B and the UE should know the configuration information.

For example, in a current LTE system, an Operation. Administration and Maintenance (OAM) node is used to coordinate the configuration of the Macro Node B and the Home Node B. In the present disclosure, the OAM node is used to provide assistant configuration information for the Macro Node B, that is, configuration information of the restricted resources and the unrestricted resources, and then the Macro Node B configures the measurement of the Macro Node B according to the assistant configuration information, and transmits the assistant configuration information to the UE. The UE performs radio resource measurement on the unrestricted resources according to the assistant configuration information first, and then performs radio resource measurement on the restricted resources according to a measurement result, so as to simplify the RRM measurement or RLM measurement, improve the precision of mobility measurement, and decrease implementation complexity of the UE.

An embodiment of the present disclosure is described herein. In order to avoid redundant description of the present disclosure, a detailed description of functions or apparatuses well known by the public is omitted hereinafter.

A First Embodiment

A radio resource measurement method in a heterogeneous network includes the flowing steps:

A1) a Macro Node B transmits configuration information of restricted resources to a UE, so as to indicate the UE that which resources are the restricted resources for RLM measurement;

B1) the UE performs RLM measurement on unrestricted resources;

C1) the UE determines whether to perform RLM measurement on the restricted resources according to a measurement result obtained by performing RLM measurement on the unrestricted resources in step B1), that is, determines whether the measurement result meets a predefined condition; if yes, step D1) is performed;

D1) the UE performs RLM measurement on the restricted resources.

Figure 3:
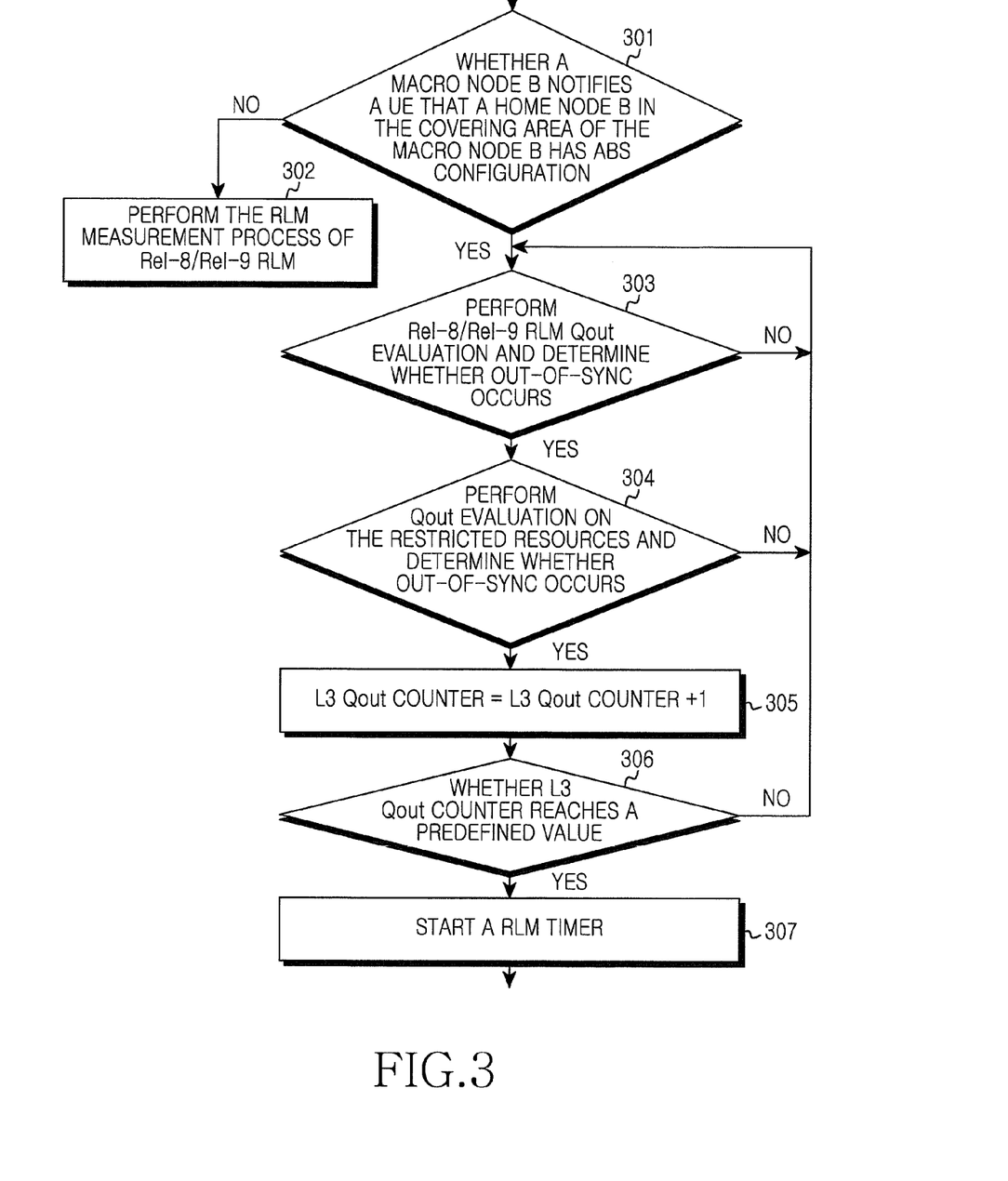
FIG. 3 illustrates an out-of-sync measurement method 1 according to a first embodiment of the present disclosure.
Figure 4:
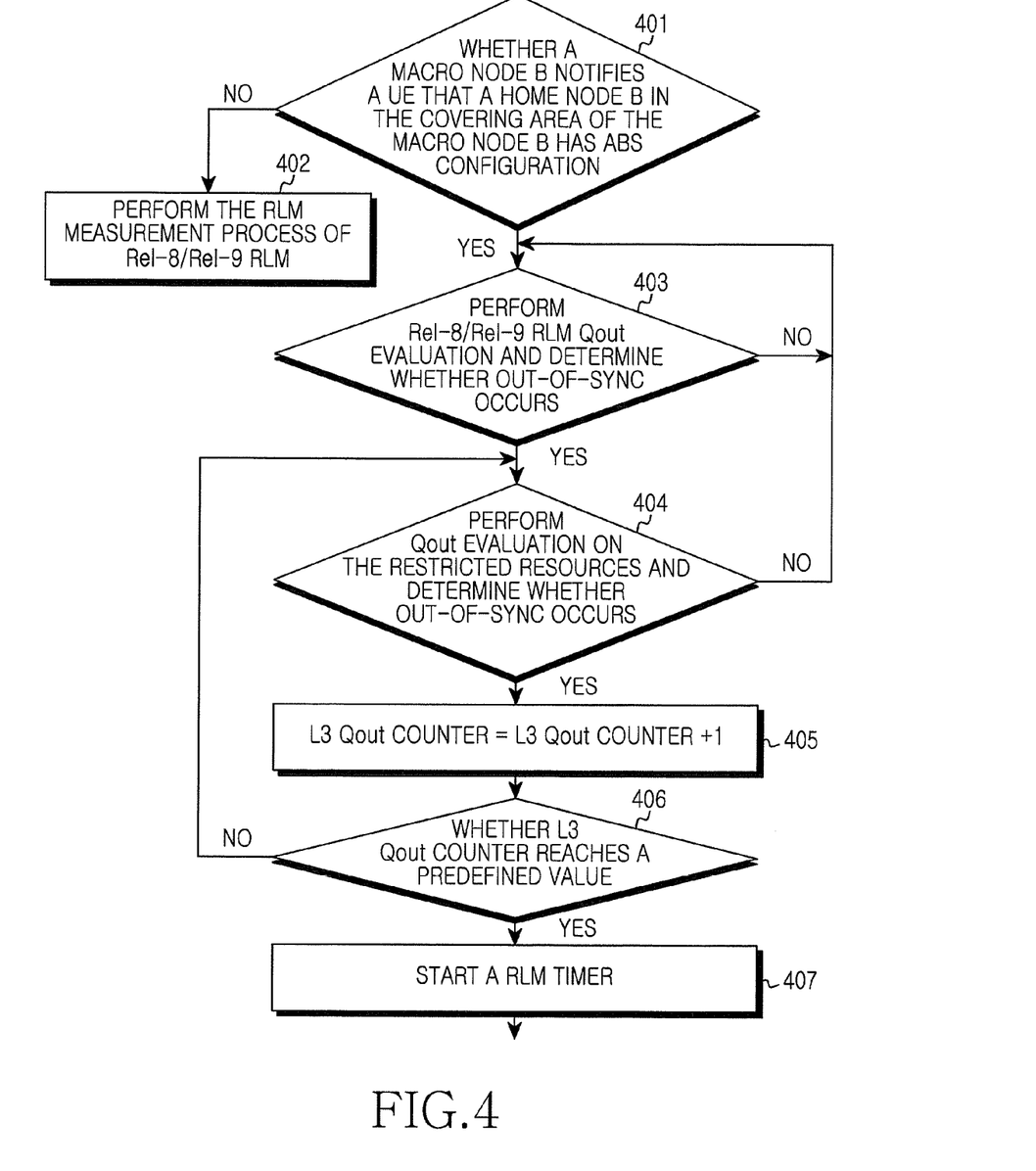
FIG. 4 illustrates an out-of-sync measurement method 2 according to the first embodiment of the present disclosure.
Figure 5:
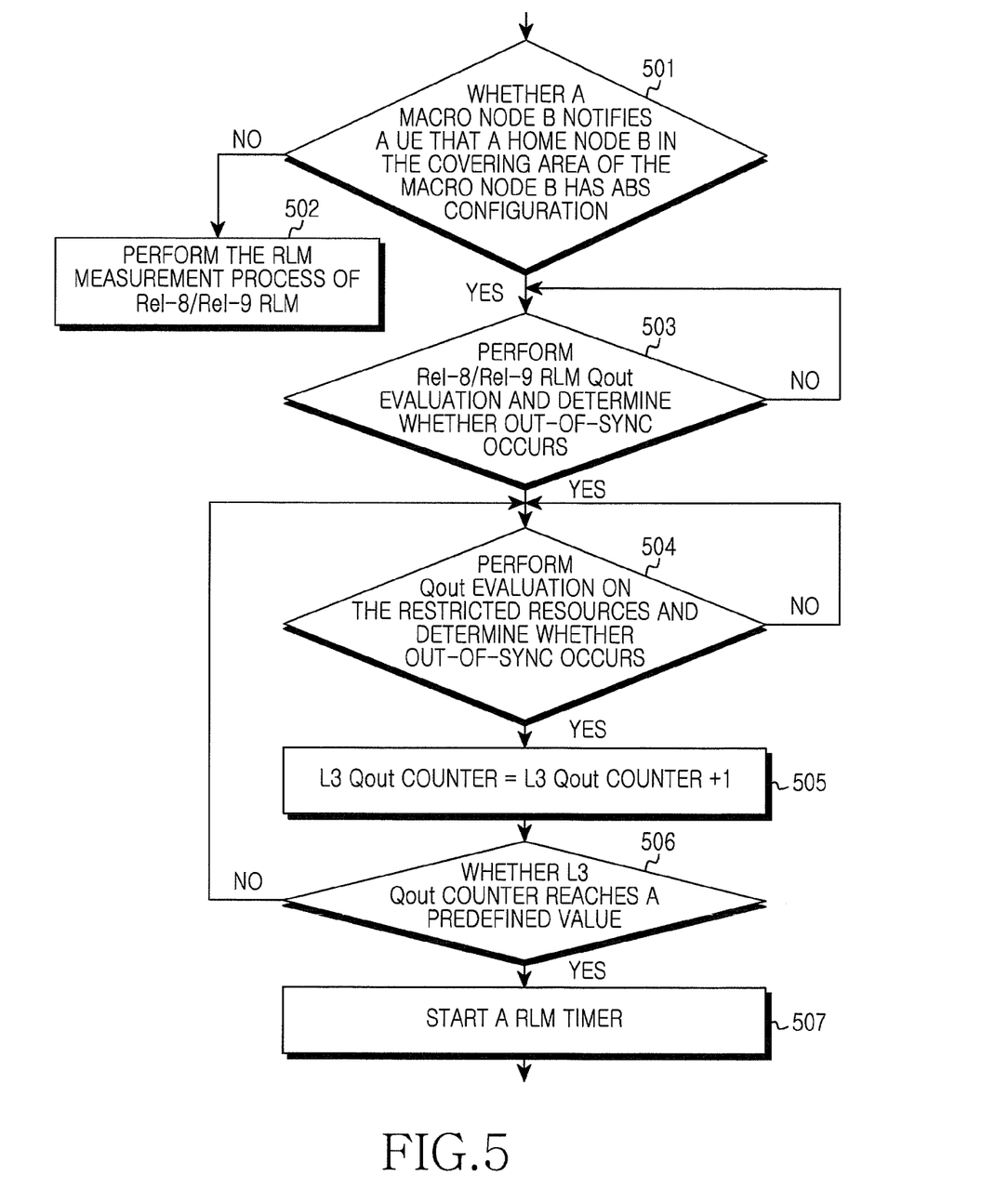
FIG. 5 illustrates an out-of-sync measurement method 3 according to the first embodiment of the present disclosure.

According to the method of the present disclosure, if the performed RLM measurement is out-of-sync measurement, the measurement method is shown in FIGS. 3-5.

FIG. 3 illustrates an out-of-sync measurement method 1 according to the first embodiment of the present disclosure.

As shown in FIG. 3, the method includes the following steps.

Step 301, it is determined whether a Macro Node B notifies a UE that a Home Node B in the covering area of the Macro Node B has ABS configuration. If the Macro Node B does not notify the UE that the Home Node B in the covering area of the Macro Node B has configuration information of restricted resources, that is, a notification message transmitted to the UE by the Macro Node B does not contain the configuration information of the restricted resources, or indication information in the notification message indicates that the Home Node B has no configuration information of the restricted resources, the UE performs step 302; if the Macro Node B notifies the UE that the Home Node B in the covering area of the Macro Node B has the configuration information of the restricted resources, the UE performs step 303.

A method for implementing step 301 of the present disclosure includes that the Macro Node B transmits configuration information of all possible restricted resources which can be configured in a LPN to the UE under the Macro Node B. The configuration information of the restricted resources is the configuration of ABSes. Each pattern of the restricted resources is a set of ABSes in a certain period. Through signaling, the Macro Node B notifies the UE of the patterns of all possible restricted resources which can be configured in the LPN. According to an implementation of the present disclosure, the Macro Node B can obtain the patterns of all possible restricted resources from an OAM node. According to another implementation of the present disclosure, the patterns of all possible restricted resources also can be defined by the specification.

Another method for implementing step 301 of the present disclosure includes that the Macro Node B transmits intersection information of configuration of all possible restricted resources which can be configured in the LPN to the UE under the Macro Node B. The configuration information of the restricted resources is configuration of ABSes. Each pattern of the restricted resources is a set of ABSes in a certain period. According to an implementation of the present disclosure, the transmitted intersection information is a subset of a set which is shared by sub-frame sets corresponding to the patterns of all possible restricted resources. According to an implementation of the present disclosure, the Macro Node B can obtain the patterns of all possible restricted resources from an OAM node. According to another implementation of the present disclosure, the patterns of all possible restricted resources also can be defined by the specification.

Another method for implementing step 301 of the present disclosure includes that the Macro Node B transmits indication information of whether radio resource measurement is to be performed on the restricted resources to the UE. If the patterns of the restricted resources are configured on some LPNs in cells covered by the Macro Node B, the Macro Node B indicates the UE to perform radio resource measurement on the restricted resources, i.e. step 303 is performed; otherwise, the Macro Node B indicates the UE not to perform radio resource measurement on the restricted resources, that is, step 302 is performed.

According to a method of the present disclosure, the indication information is carried in a field of neighbor cell configuration information in a conventional RRC message.

Specifically, in a NeighCellConfig Information Element (IE) of the conventional RRC message, if NeighCellConfig="11", it is indicated that the UE needs to perform RLM measurement or RRM measurement on the restricted resources; otherwise, it is indicated that the UE does not need to perform RLM measurement or RRM measurement on the restricted resources.

Step 302, the RLM measurement process of Rel-8 or Rel-9 is performed.

Step 303, the RLM measurement is performed on unrestricted resources, an out-of-sync evaluation is performed according to a measurement result, and it is determined whether out-of-sync occurs; if out-of-sync does not occur, step 303 continues to be performed at the next RLM measurement time; if out-of-sync occurs, step 304 is performed.

A specific method for implementing this step includes that the out-of-sync evaluation is performed according to an out-of-sync evaluation method of Rel-8 or Rel-9, and it is determined whether out-of-sync occurs.

Step 304, the RLM measurement is performed on the restricted resources, the out-of-sync evaluation is performed, and it is determined whether out-of-sync occurs; if out-of-sync does not occur, step 303 is performed at the next RLM measurement time; if out-of-sync occurs, step 305 is performed.

Step 305, a Qout counter of layer 3 (L3) is added by 1.

Step 306, it is determined whether the Qout counter reaches a predefined value; if the Qout counter reaches the predefined value, step 307 is performed; otherwise, step 303 is performed at the next RLM measurement time.

Step 307, a RLM timer is started.

FIG. 4 illustrates an out-of-sync measurement method 2 according to the first embodiment of the present disclosure.

As shown in FIG. 4, the method includes the following steps.

Step 401, it is determined whether the Macro Node B notifies the UE that the Home Node B in the covering area of the Macro Node B has configuration of restricted resources. Similar to step 301, if the Macro Node B does not notify the UE that the Home Node B in the covering area of the Macro Node B has configuration information of restricted resources, the UE performs step 402; if the Macro Node B notifies the UE that the Home Node B in the covering area of the Macro Node B has the configuration information of the restricted resources, step 403 is performed.

According to the method of the present disclosure, step 401 is the same as step 301 in the above method 1.

Step 402, the UE performs RLM measurement according to a RLM measurement process of Rel-8 or Rel-9.

Step 403, the RLM measurement is performed on unrestricted resources, an out-of-sync evaluation is performed according to a RLM measurement result, and it is determined whether out-of-sync occurs; if out-of-sync does not occurs, step 403 continues to be performed at the next RLM measurement time; if out-of-sync occurs, step 404 is performed.

A specific method for implementing this step includes that the out-of-sync evaluation is performed according to an outof-sync evaluation method of Rel-8 or Rel-9, and it is determined whether out-of-sync occurs.

Step 404, the RLM measurement is performed on the restricted resources, the out-of-sync evaluation is performed, and it is determined whether out-of-sync occurs; if out-of-sync does not occurs, step 403 is performed at the next RLM measurement time; if out-of-sync occurs, step 405 is performed.

Step 405, the Qout counter of layer 3 (L3) is added by 1.

Step 406, it is determined whether the Qout counter reaches a predefined value; if the Qout counter reaches a predefined value, step 407 is performed; otherwise, step 404 is performed at the next RLM measurement time.

Step 407, a RLM timer is started.

FIG. 5 illustrates an out-of-sync measurement method 3 according to the first embodiment of the present disclosure.

As shown in FIG. 5, the method includes the following steps.

Step 501, it is determined whether the Macro Node B notifies the UE that the Home Node B in the covering area of the Macro Node B has configuration of restricted resources. If the Macro Node B does not notify the UE that the Home Node B in the covering area of the Macro Node B has configuration information of restricted resources, the UE performs step 502; if the Macro Node B notifies the UE that the Home Node B in the covering area of the Macro Node B has the configuration information of the restricted resources, step 503 is performed.

According to the method of the present disclosure, step 501 is the same as step 301 in the above method 1.

Step 502, the RLM measurement process of Rel-8 or Rel-9 is performed.

Step 503, the RLM measurement is performed on unrestricted resources, an out-of-sync evaluation is performed according to a RLM measurement result, and it is determined whether out-of-sync occurs; if out-of-sync does not occur, step 503 continues to be performed at the next RLM measurement time; if out-of-sync occurs, step 504 is performed.

A specific method for implementing this step includes that the out-of-sync evaluation is performed according to an out-of-sync evaluation method of Rel-8 or Rel-9, and it is determined whether out-of-sync occurs.

Step 504, the RLM measurement is performed on the restricted resources, the out-of-sync evaluation is performed, and it is determined whether out-of-sync occurs; if out-of-sync does not occur, step 504 continuous to be performed at the next RLM measurement time; if out-of-sync occurs, step 505 is performed.

Step 505, the Qout counter of layer 3 (L3) is added by 1.

Step 506, it is determined whether the Qout counter reaches a predefined value; if the Qout counter reaches a predefined value, step 507 is performed; otherwise, step 504 is performed at the next RLM measurement time.

Step 507, a RLM timer is started.

In the methods shown in FIGS. 3 to 5, when the out-of-sync counter reaches a predefined value, the RLM timer will be started. Afterwards, the UE will perform in-sync measurement.

Figure 6:
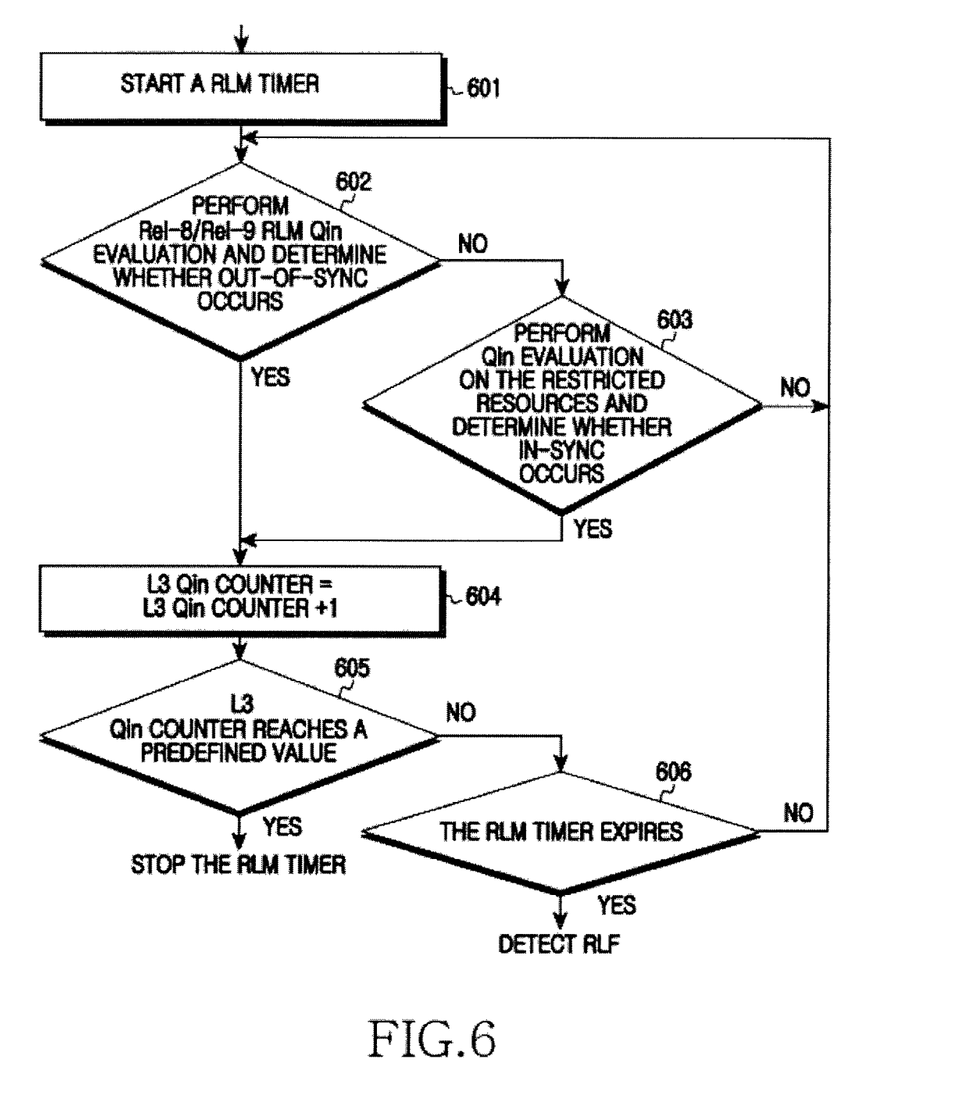
FIG. 6 illustrates an in-sync measurement method according to the first embodiment of the present disclosure.

According to the method of the present disclosure, if the performed RLM measurement is the in-sync measurement, the method of the present disclosure is as shown in FIG. 6.

FIG. 6 illustrates an in-sync measurement method according to the first embodiment of the present disclosure.

As shown in FIG. 6, the method includes the following steps.

Step 601, a RLM timer is started.

Step 602, RLM measurement is performed on unrestricted resources, an in-sync evaluation is performed according to a RLM measurement result, and it is determined whether in-sync occurs; if in-sync does not occurs, step 603 is performed; if in-sync occurs, step 604 is performed.

A specific method for implementing this step includes that the in-sync evaluation is performed according to an in-sync evaluation method of Rel-8 or Rel-9, and it is determined whether in-sync occurs.

Step 603, the RLM measurement is performed on the restricted resources, the in-sync evaluation is performed according to a RLM measurement result, and it is determined whether in-sync occurs; if in-sync does not occurs, step 602 is performed at the next RLM measurement time; if in-sync occurs, step 604 is performed.

Step 604, a Qin counter of layer 3 (L3) is added by 1.

Step 605, it is determined whether the Qin counter reaches a predefined value; if the Qin counter reaches the predefined value, the RLM timer is stopped; otherwise, step 606 is performed.

Step 606, it is determined whether the RLM timer expires; if the RLM timer does not expire, step 602 is performed at the next RLM measurement time; if the RLM timer expires, RLF is detected and an operation process for the RLF is performed to implement a radio link monitoring process.

In step 304 of the out-of-sync measurement method 1, step 404 of the out-of-sync measurement method 2, step 504 of the out-of-sync measurement method 3, and step 603 of the in-sync measurement method, a specific implementation of the present disclosure is as follows.

In step 301, it is supposed that the signaling transmitted to the UE by the Macro Node B contains patterns of all possible restricted resources. According to a method of the present disclosure, when the UE performs the out-of-sync evaluation on the restricted resources, if out-of-sync occurs on the patterns of all possible restricted resources, the UE determines that out-of-sync occurs on the restricted resources; otherwise, the UE determines that out-of-sync does not occur. When the UE performs the in-sync evaluation on the restricted resources, if in-sync occurs on any one of the patterns of all possible restricted resources, the UE determines that in-sync occurs on the restricted resources; otherwise, the UE determines that in-sync does not occur. According to another method of the present disclosure, the UE performs the out-of-sync evaluation or the in-sync evaluation on a subset of intersection of sub-frame sets corresponding to the patterns of all possible restricted resources, that is, on a subset of a sub-frame set shared by sub-frame sets corresponding to the patterns of all possible restricted resources. If out-of-sync or in-sync occurs on the subset, it is determined that out-of-sync or in-sync occurs; otherwise, out-of-sync or in-sync does not occur. Generally, the UE performs measurement for sub-frames in the subset, if the measurement result meets threshold requirements of out-of-sync, out-of-sync occurs on the subset, otherwise, out-of-sync does not occurs on the subset. If the measurement result meets threshold requirements of in-sync, in-sync occurs on the subset; otherwise, in-sync does not occur on the subset.

In step 301, if the signaling transmitted to the UE by the Macro Node B carries subset information of intersection of patterns of all possible restricted resources which can be configured in the LPN, that is, subset information of an intersection shared by sub-frame sets corresponding to the patterns of all possible restricted resources, the UE performs out-of-sync evaluation or in-sync evaluation on the subset. If out-of-sync or in-sync occurs on the subset, it is determined that out-of-sync or in-sync occurs; otherwise, out-of-sync or in-sync does not occur.

By performing the out-of-sync evaluation or the in-sync evaluation on the subset, and determining whether out-of-sync or in-sync occurs on the restricted resources according to whether out-of-sync or in-sync occurs on the subset, the method has the following advantages.

Firstly, when the patterns of the restricted resources configured in the Home Node B changes, as long as the changed patterns of the restricted resources includes the subset, it is unnecessary for the Macro Node B to transmit the changed patterns of the restricted resources to the UE under the Macro Node B, so as to decrease signaling interaction and save resources.

Secondly, when multiple patterns of the restricted resources are configured in the Home Node B, it is unnecessary to perform radio resource measurement on each pattern of the restricted resources, so as to reduce measurement workload.

In step 301, if the Macro Node B indicates in the signaling transmitted to the UE whether to perform RLM measurement on the restricted resources, the UE performs RLM measurement on the patterns of the possible restricted resources defined by the specification. According to a method of the present disclosure, when the UE performs the out-of-sync evaluation on the restricted resources, if out-of-sync occurs on the patterns of all possible restricted resources, the UE determines that out-of-sync occurs on the restricted resources; otherwise, the UE determines that out-of-sync does not occur. When the UE performs the in-sync evaluation on the restricted resources, if in-sync occurs on any one of the patterns of all possible restricted resources, the UE determines that in-sync occurs on the restricted resources; otherwise, the UE determines that in-sync does not occur. According to another method of the present disclosure, the UE performs the out-of-sync evaluation or the in-sync evaluation on a subset of intersection of sub-frame sets corresponding to the patterns of all possible restricted resources, that is, on a subset of an intersection shared by the sub-frame sets corresponding to the patterns of all possible restricted resources. If out-of-sync or in-sync occurs on the subset, it is determined that out-of-sync or in-sync occurs; otherwise, out-of-sync or in-sync does not occur.

A Second Embodiment

A radio resource measurement method in a heterogeneous network includes the flowing steps:

A2) a Macro Node B transmits configuration information of restricted resources to a UE, so as to indicate the UE that which resources are the restricted resources for RRM measurement;

B2) the UE performs RRM measurement on unrestricted resources;

C2) the UE determines whether to perform RRM measurement on the restricted resources according to a measurement result obtained by performing the RRM measurement on the unrestricted resources in step B2), that is, whether the measurement result meets a predefined condition; if yes, step D2) is performed; otherwise, step B2) is performed at the next RRM measurement time.

In step C2), according to a method of the present disclosure, meeting the predefined condition includes that when a difference between a measurement result obtained by performing the RRM measurement for a neighbor Home Node B by the UE and a measurement result obtained by performing the RRM measurement for the serving Macro Node B by the UE is larger than a predefined value, the RRM measurement result meets the predefined condition.

D2) the UE performs the RRM measurement on the restricted resources.

In step D2), the UE can also perform the RRM measurement on the unrestricted resources, and it is determined whether the RRM measurement result on the unrestricted resources meets another threshold requirements; if yes, step B2) is performed; otherwise, step D2) is performed.

According to another method of the present disclosure, in step D2), the UE can determine whether the measurement obtain by performing the RRM measurement on the restricted resources meets another threshold requirements; if yes, step B2) is performed; otherwise, step D2) is performed.

In a method of the present disclosure, meeting another threshold requirements includes that when a difference between the measurement result obtained by performing the RRM measurement for the serving Macro Node B by the UE and the measurement result obtained by performing the RRM measurement for the neighbor Home Node B by the UE is larger than a predefined value, the measurement result meets another threshold requirements.

Figure 7:
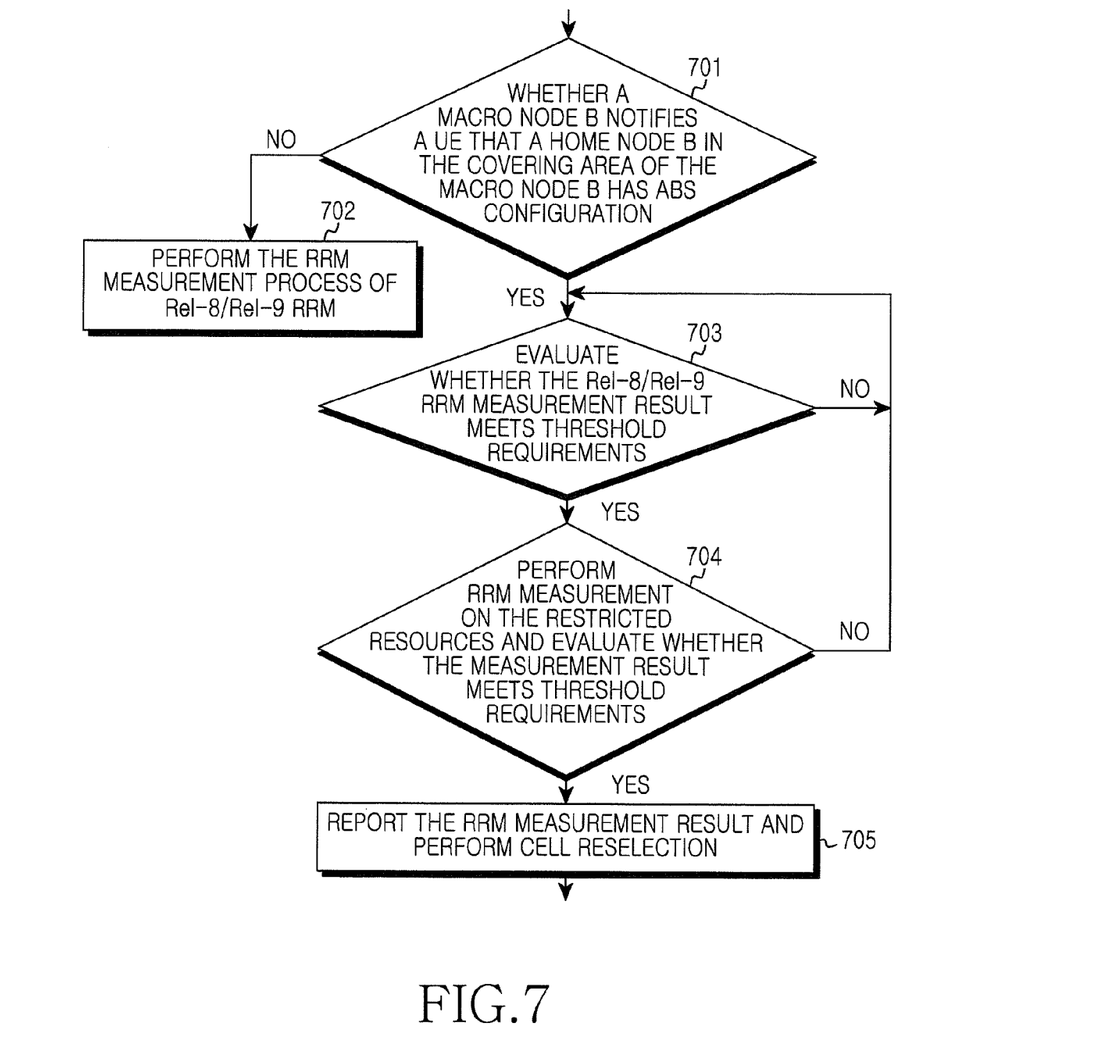
FIG. 7 illustrates an RRM measurement method in a heterogeneous network according to a second embodiment of the present disclosure.

A detailed process of performing RRM measurement in a heterogeneous network is shown in FIG. 7.

FIG. 7 illustrates an RRM measurement method in a heterogeneous network according to a second embodiment of the present disclosure.

As shown in FIG. 7, the detailed process includes the following steps.

Step 701, it is determined whether a Macro Node B notifies a UE that a Home Node B in the covering area of the Macro Node B has configuration information of restricted resources. If the Macro Node B does not notify the UE that the Home Node B in the covering area of the Macro Node B has the configuration information of the restricted resources, the UE performs step 702; if the Macro Node B notifies the UE that the Home Node B in the covering area of the Macro Node B has the configuration information of the restricted resources, step 703 is performed.

A method for implementing step 701 of the present disclosure includes that the Macro Node B transmits configuration information of all possible restricted resources which can be configured in the LPN to the UE. The configuration information of the restricted resources is ABS patterns. Each pattern of the restricted resources is a set of sub-frames in a certain period. Through signaling, the Macro Node B notifies the UE of the configuration information of the patterns of all possible restricted resources which can be configured in the LPN. According to a method of the present disclosure, the Macro Node B can obtain the configuration information of the patterns of all possible restricted resources from an OAM node. According to another method of the present disclosure, the configuration information of the patterns of all possible restricted resources also can be defined by the specification.

Another method for implementing step 701 of the present disclosure includes that the Macro Node B transmits intersection information of configuration of all possible restricted resources which can be configured in the LPN to the UE. The configuration of the restricted resources is ABS patterns. Each pattern of the restricted resources is a set of sub-frames in a certain period. The intersection information is a subset of a set shared by sub-frame sets corresponding to the patterns of all possible restricted resources. According to a method of the present disclosure, the Macro Node B can obtain the configuration information of the patterns of all possible restricted resources from an OAM node. According to another method of the present disclosure, the configuration information of the patterns of all possible restricted resources can also be defined by the specification.

Another method for implementing step 701 of the present disclosure includes that the Macro Node B transmits indication information of whether RRM measurement is to be performed on the restricted resources to the UE. If the patterns of the restricted resources are configured in some LPNs in cells covered by the Macro Node B, the Macro Node B indicates the UE to perform RRM measurement on the restricted resources; otherwise, the Macro Node B indicates the UE not to perform RRM measurement on the restricted resources.

Step 702, a RRM measurement process of Rel-8 or Rel-9 is performed.

Step 703, the RRM measurement is performed on unrestricted resources. A specific method for implementing this step includes that the UE performs measurement according to a measurement method of Rel-8 or Rel-9, evaluate the measurement result, and determines whether the measurement result meets threshold requirements; if the measurement result meets the threshold requirements, step 704 is performed; otherwise, step 703 continuous to be performed.

In a method of the present disclosure, performing the RRM measurement in step 703 is performing measurement for signal strength of a cell where the LPN is located, and it is determined whether the measurement result meets threshold requirements.

In another method of the present disclosure, performing the RRM measurement in step 703 is performing measurement for the signal strength of the cell where the LPN is located, and it is determined whether the measurement result meets the threshold value. Herein, Signal-to-Noise can be used to indicate signal quality of the cell.

In step 703, if the measurement result obtained by performing measurement on the unrestricted resources according to a RRM measurement process is evaluated and the evaluation result does not meet threshold requirements, step 703 is performed at the next RRM measurement time.

In step 703, if a measurement result obtained by performing measurement on the unrestricted resources according to a RRM measurement process is evaluated and the evaluation result meets the threshold requirements, step 704 is performed at the next RRM measurement time.

Step 704, the UE performs the RRM measurement on the restricted resources, and evaluates whether the measurement result meets the threshold requirements; if yes, step 705 is performed; otherwise, step 703 is performed.

According to a method of the present disclosure, if the UE is in a Connected mode, step 705 includes reporting the RRM measurement result.

According to another method of the present disclosure, if the UE is in an Idle mode, step 705 includes performing Cell Reselection.

According to an implementation of the present disclosure, step 704 is as follows.

In step 701, it is supposed that the signaling transmitted to the UE by the Macro Node B carries the patterns of all possible restricted resources. According to a method of the present disclosure, when the UE evaluates the measurement result obtained by performing the RRM measurement on the restricted resources, if the measurement result on any one of the patterns of all possible restricted resources meets the threshold requirements, the UE determines that the measurement result on the restricted resources meets the measurement report condition; otherwise, the UE determines that the measurement result does not meet a measurement report condition. According to another method of the present disclosure, the UE evaluates the measurement result obtained by performing the RRM measurement on the intersection of sub-frame sets corresponding to the patterns of all restricted resources, if the measurement result on the intersection meets the threshold requirements, the UE determines that the measurement result on the restricted resources meets the threshold requirements; otherwise, the UE determines that the measurement result on the restricted resources does not meet the threshold requirements. According to another method of the present disclosure, the UE evaluates the measurement result obtained by performing the RRM measurement on a subset of intersection of sub-frame sets corresponding to the patterns of all possible restricted resources, that is, on a subset of a sub-frame set shared by sub-frame sets corresponding to the patterns of all possible restricted resources. If the measurement result meets the threshold requirements, the UE determines that the measurement result on the restricted resources meets the threshold requirements; otherwise, the UE determines that the measurement result on the restricted resources does not meet the threshold requirements.

In step 701, if the signaling transmitted to the UE by the Macro Node B carries intersection information of configuration of all possible restricted resources which can be configured in the LPN, i.e. subset information of a set shared by sub-frame sets corresponding to the patterns of all possible restricted resources, the UE evaluates the measurement result obtained by performing the RRM measurement on the subset. If the measurement result on the subset meets the threshold requirements, the UE determines that the measurement result on the restricted resources meets the threshold requirements; otherwise, the UE determines that the measurement result does not meet the threshold requirements.

In step 701, if the Macro Node B indicates in the signaling transmitted to the UE whether to perform the RRM measurement on the restricted resources, the UE performs the RRM measurement on the patterns of the possible restricted resources defined by the specification. According to a method of the present disclosure, when the UE evaluates the measurement result obtained by performing the RRM measurement on the restricted resources, if the measurement result on any one of the patterns of all possible restricted resources meets the threshold requirements, the UE determines that the measurement result on the restricted resources meets the threshold requirements; otherwise, the UE determines that the measurement result on the restricted resources does not meet the threshold requirements. According to another method of the present disclosure, the UE evaluates the measurement result obtained by performing the RRM measurement on a subset of intersection of sub-frame sets corresponding to the patterns of all possible restricted resources, i.e. on a subset of a sub-frame set shared by sub-frame sets corresponding to the patterns of all possible restricted resources. If the measurement result on the subset meets the threshold requirements, the UE determines that the measurement result on the subset meets the threshold requirements; otherwise, the UE determines that the measurement result on the subset does not meet the threshold requirements.

A Third Embodiment

A RLM measurement method in a heterogeneous network includes the following steps.

A3) a Macro Node B transmits configuration information of restricted resources to a UE, so as to indicate the UE that which resources are the restricted resources for RLM measurement;

B3) the UE performs RRM measurement on unrestricted resources;

C3) the UE determines whether to perform RLM measurement on the restricted resources according to a measurement result obtained by performing the RRM measurement on the unrestricted resources in step B3), that is, whether the measurement result meets a predefined condition; if yes, step D3) is performed; otherwise, step B3) is performed.

In step C3), according to a method of the present disclosure, meeting the predefined condition includes that when a difference between a measurement result obtained by performing the RRM measurement for a neighbor Home Node B by the UE and a measurement result obtained by performing the RRM measurement for the serving Macro Node B by the UE is larger than a predefined value, the RRM measurement result meets the predefined condition.

D3) the UE performs the RLM measurement on the restricted resources.

In step D3), the UE can also perform the RRM measurement on the unrestricted resources, and determine whether the RRM measurement result on the unrestricted resources meets another threshold requirements; if yes, step B3) is performed; otherwise, step D3) is performed.

According to another method of the present disclosure, in step D3), the UE can perform the RLM measurement and RRM measurement on the restricted resources, and determine whether the RRM measurement result meets another threshold requirements; if yes, step B3) is performed; otherwise, step D3) is performed.

In another method of the present disclosure, meeting another threshold requirements includes that when a difference between the RRM measurement result obtained by performing the RRM measurement for the serving Macro Node B by the UE and the RRM measurement result obtained by performing the RRM measurement for a neighbor Home Node B by the UE is larger than a predefined value, the RRM measurement result meets another threshold requirements.

Step A3) is the same as that described in the first embodiment, and will not be described repeatedly.

An implementation of step B3) in the embodiment of the present disclosure includes that the UE under the Macro Node B performs measurement for signal strength of a cell where a neighbor LPN is located according to the RRM measurement process.

Another implementation of step B3) in the embodiment of the present disclosure includes that the UE under the Macro Node B performs measurement for signal quality of the cell where the neighbor LPN is located according to the RRM measurement process.

An implementation of step C3) in the embodiment of the present disclosure includes that the UE under the Macro Node B determines according to the measurement result in step B3) whether to perform RLM measurement on the restricted resources. A detailed implementation includes that the UE evaluates the obtained measurement result of the signal strength of the cell where the neighbor LPN is located in step B3), if the signal strength or signal quality of the cell where the neighbor LPN is located reaches a predefined threshold value, the UE performs the RLM measurement on the restricted resources; if the signal strength of the cell where the neighbor LPN is located is lower than the predefined threshold value, the RLM measurement on the restricted resources is resumed.

In the second and third embodiments, the RRM measurement result is used to determine whether to switch the radio resource measurement on the unrestricted resources to the radio resource measurement on the restricted resources, or whether to switch the radio resource measurement on the restricted resources to the radio resource measurement on the unrestricted resources. In actual applications, the UE under the Macro Node B usually approaches the Home Node B, and then leaves the Home Node B. During the process that the UE approaches and leaves the Home Node B, the Home Node B can not greatly interfere with the UE under the Macro Node B unless the UE under the Macro Node B is near to the Home Node B; the Home Node B does not greatly interfere with the UE under the Macro Node B when the UE under the Macro Node B is far from the Home Node B. Thus, it is unnecessary for the UE under the Macro Node B to perform the RLM measurement or RRM measurement on the restricted resources all along. Therefore, the present disclosure points out that the UE under the Macro Node B performs radio resource measurement on the unrestricted resources first, then performs radio resource measurement on the restricted resources when the measurement result on the unrestricted resources meets a predefined condition, and performs radio resource measurement on the unrestricted resources when the measurement result on the unrestricted resources or on the restricted resources meets another predefined condition.

Figure 8:
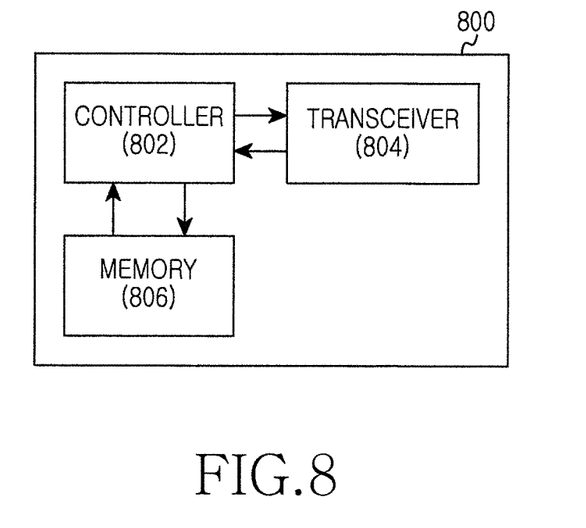
FIG. 8 illustrates a user equipment according to an embodiment of the present invention.

Referring to FIG. 8, a diagram illustrates a UE (800), according to an embodiment of the present invention. The UE includes a controller 802 that performs a first radio resource measurement and when an obtained measurement result meets a predefined condition, performs a second radio resource measurement on restricted resources according to configuration information of the restricted resources, wherein the restricted resources are a set of all sub-frame resources corresponding to Almost Blank Sub-frames (ABSes) or are a subset of the set. The UE also includes a memory 806 that stores the configuration information of the restricted resources and the measurement result. The Macro UE further includes a transceiver (804) that transmits the measurement result to the Macro NodeB and receives the configuration information of the restricted resources from the Macro NodeB.

According to the method of the present disclosure, the UE does not need to perform measurement on the restricted resources in any case, but further determines whether to perform measurement on the restricted resources according to the measurement result obtained in a LTE Rel-8 or Rel-9 measurement method, so as to avoid an unnecessary complex measurement process, decrease the measurement complexity of the UE in the heterogeneous network, and guarantee the measurement precision and measurement stability.

The foregoing are only preferred embodiments of the present disclosure and are not for use in limiting the protection scope of the present disclosure. Any modification, equivalent replacement and improvement made within the scope of the present disclosure should be covered under the protection scope of the present disclosure. Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A radio resource measurement method in a heterogeneous network, comprising:
   receiving, by a User Equipment (UE), configuration information of unrestricted resources and restricted resources from a Macro Node B;
   performing, by the UE, radio resource measurement on the unrestricted resources based on the configuration information;

if a result of the resource measurement on the unrestricted resource meets a predefined condition, performing, by the UE, radio resource measurement on the restricted resources based on the configuration information, wherein the restricted resources are sub-frame resources corresponding to Almost Blank Sub-frames (ABSes).

2. The method of claim 1, wherein performing the radio resource measurement comprises:

performing, by the UE, the radio resource measurement on the unrestricted resources, wherein the unrestricted resources comprise measurement resources corresponding to non-ABSes.

3. The method of claim 2, wherein the configuration information of the restricted resources in the performing radio resource measurement on the restricted resources is configuration information of all possible restricted resources which are configured at a Low Power Node (LPN), and is transmitted to the UE by the Macro Node B prior to the performing radio resource measurement.

4. The method of claim 2, wherein the configuration information of the restricted resources in the performing radio resource measurement on the restricted resources is intersection information of all possible restricted resources which are configured at a LPN, and is transmitted to the UE by the Macro Node B prior to the performing radio resource measurement.

5. The method of claim 2, wherein the configuration information of the restricted resources in the performing radio resource measurement on restricted resources is indication information of whether the radio resource measurement is to be performed on the restricted resources, and is transmitted to the UE by the Macro Node B prior to the performing radio resource measurement.

6. The method of claim 2, wherein the configuration information of the restricted resources is defined by a specification in advance.

7. The method of claim 2, wherein the radio resource measurement in the performing radio resource measurement on restricted resources comprises: if a measurement result of RRM measurement on any one of patterns of all possible restricted resources meets threshold requirements, determining, by the UE, that the measurement result meets the threshold requirements on the restricted resources; otherwise, determining that the measurement result does not meet the threshold requirements on the restricted resources.

8. The method of claim 7, further comprising:
if the UE is in a connected mode, reporting, by the UE, the measurement result to a network side after determining that the measurement result meets the threshold requirements on the restricted resources;
if the UE is in an idle mode, performing, by the UE, cell reselection after determining that the measurement result meets the threshold requirements on the restricted resources.

9. The method of claim 2, wherein the radio resource measurement in the performing radio resource measurement on restricted resources comprises: evaluating, by the UE, a RRM measurement result on an intersection of sub-frame sets corresponding to patterns of all the restricted resources; if a measurement result on the intersection meets threshold requirements, determining, by the UE, that the measurement result meets the threshold requirements on the restricted resources; otherwise, determining that the measurement result does not meet the threshold requirements on the restricted resources.

10. The method of claim 2, wherein the radio resource measurement in the performing radio resource measurement on restricted resources comprises: evaluating, by the UE, a RRM measurement result on a subset of sub-frame sets corresponding to patterns of all the restricted resources; if a measurement result on the subset meets threshold requirements, determining, by the UE, that the measurement result meets the threshold requirements on the restricted resources; otherwise, determining that the measurement result does not meet the threshold requirements on the restricted resources.

11. The method of claim 1, wherein the radio resource measurement in the performing radio resource measurement on restricted resources comprises: performing, by the UE, an out-of-sync evaluation on patterns of all possible restricted resources; if out-of-sync occurs on the patterns of all possible restricted resources, determining, by the UE, that the out-of-sync occurs on the restricted resources; otherwise, determining, by the UE, that the out-of-sync does not occur on the restricted resources, wherein the patterns of the restricted resources are a set of sub-frames corresponding to ABSes in a period or are a subset of the set.

12. The method of claim 11, wherein the radio resource measurement in the performing radio resource measurement comprises: performing, by the UE, an out-of-sync evaluation on the unrestricted resources;
the predefined condition comprises: the out-of-sync occurs on the unrestricted resources.

13. The method of claim 12, wherein the radio resource measurement in the performing radio resource measurement on restricted resources comprises: performing, by the UE, the out-of-sync evaluation on the restricted resources; if the out-of-sync does not occur, returning to the performing radio resource measurement; if the out-of-sync occurs, adding 1 to a Qout counter of layer 3 (L3).

14. The method of claim 12, wherein the radio resource measurement in the performing radio resource measurement on restricted resources comprises: performing, by the UE, the out-of-sync evaluation on the restricted resources; if the out-of-sync does not occur, returning to the operation of performing the radio resource measurement on the restricted resources in the performing radio resource measurement on restricted resources; if the out-of-sync occurs, adding 1 to a Qout counter of layer 3 (L3).

15. The method of claim 1, wherein the radio resource measurement in step B) comprises: performing, by the UE, an in-sync evaluation on the restricted resources; if in-sync occurs on any one of patterns of all possible restricted resources, determining, by the UE, that in-sync occurs on the restricted resources; otherwise, determining, by the UE, that the in-sync does not occur on the restricted resources.

16. The method of claim 15, wherein the radio resource measurement in the performing radio resource measurement comprises: performing, by the UE, the in-sync evaluation on the unrestricted resources;
the predefined condition comprises: the in-sync does not occur on the unrestricted resources.

17. The method of claim 1, wherein performing the radio resource measurement on the restricted resources in the performing radio resource measurement on restricted resources comprises: performing, by the UE, an out-of-sync evaluation or an in-sync evaluation on a subset of a set of patterns of all possible restricted resources; if out-of-sync or in-sync occurs on the subset, determining that out-of-sync or in-sync occurs on the UE; otherwise, determining that the out-of-sync or the in-sync does not occur on the UE.

18. The method of claim 1, wherein the radio resource measurement in the performing radio resource measurement is Radio Resource Management (RRM) measurement, and the radio resource measurement in the performing radio resource measurement on restricted resources is Radio Link Monitoring (RLM) measurement or the RRM measurement.

19. The method of claim 18, wherein the performing radio resource measurement on restricted resources further comprises:
performing, by the UE, the RRM measurement on the unrestricted resources or the restricted resources, and determining whether a measurement result of the RRM measurement meets threshold requirements; if yes, returning to the performing radio resource measurement; otherwise, returning to the performing radio resource measurement on restricted resources.

20. A mobile terminal configured to perform a resource measurement in a heterogeneous network, the mobile terminal comprising:
a transceiver configured to receive configuration information of unrestricted resource and restricted resources from a Macro Node B; and
a controller configured to:
perform radio resource measurement on the unrestricted resource based on the configuration information, and
if a result of radio resource measurement on the unrestricted resource meets a predefined condition, perform a radio resource measurement on the restricted resources based on the configuration information,
wherein the restricted resources are sub-frame resources corresponding to Almost Blank Sub-frames (ABSes).

* * * * *